United States Patent
Xu et al.

(10) Patent No.: US 10,755,091 B2
(45) Date of Patent: Aug. 25, 2020

(54) METHOD AND APPARATUS FOR RETRIEVING IMAGE-TEXT BLOCK FROM WEB PAGE

(71) Applicant: Baidu Online Network Technology (Beijing) Co., Ltd., Beijing (CN)

(72) Inventors: Guoqiang Xu, Beijing (CN); Cunxiang Yin, Beijing (CN); Jianping Shen, Beijing (CN); Huiqiang Zhong, Beijing (CN); Bin Luo, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 16 days.

(21) Appl. No.: 16/133,355

(22) Filed: Sep. 17, 2018

(65) Prior Publication Data
US 2019/0108393 A1    Apr. 11, 2019

(30) Foreign Application Priority Data
Oct. 11, 2017    (CN) .......................... 2017 1 0941523

(51) Int. Cl.
*G06K 9/34*    (2006.01)
*G06K 9/00*    (2006.01)
(Continued)

(52) U.S. Cl.
CPC ..... *G06K 9/00456* (2013.01); *G06F 16/5846* (2019.01); *G06F 16/9535* (2019.01); *G06K 9/2054* (2013.01)

(58) Field of Classification Search
CPC ............. G06K 9/00456; G06K 9/2054; G06K 9/00463; G06K 2009/00489; G06F 16/9535; G06F 16/5846
See application file for complete search history.

(56) References Cited

U.S. PATENT DOCUMENTS

2008/0205775 A1*    8/2008    Brinker ................. G06F 16/353
                                                                382/225
2014/0258032 A1*    9/2014    Psota ..................... G06Q 30/02
                                                                705/26.35
(Continued)

FOREIGN PATENT DOCUMENTS

CN          102298638 A        12/2011
CN          104268148 A         1/2015
(Continued)

OTHER PUBLICATIONS

Grigalis et al., "Clustering Visually Similar Web Page Elements for Structured Web Data Extraction"; Vilnius Gediminas Technical University, Lithuania, pp. 435-438 (2012).
(Continued)

*Primary Examiner* — Dhaval V Patel
(74) *Attorney, Agent, or Firm* — Knobbe, Martens, Olson & Bear, LLP

(57) ABSTRACT

A method for retrieving an image-text block from a web page is provided, which comprises: retrieving an image node; filtering the image node to obtain candidate image nodes; traversing, for each of the candidate image nodes, a node in sequence toward an ancestor node of the candidate image node in a preset maximum traversal depth until an ancestor node with a text is visited, using the ancestor node with the text as a candidate image-text block; clustering the candidate image-text blocks based on hash values of the path information of the candidate image-text blocks; and determining, for each image-text block cluster, a common ancestor node of the candidate image-text blocks within the image-text block cluster based on the path information of the candidate image-text blocks, and determining path information of the image-text block cluster based on the common ancestor node.

12 Claims, 4 Drawing Sheets

(51) Int. Cl.
G06K 9/20 (2006.01)
G06F 16/583 (2019.01)
G06F 16/9535 (2019.01)

(56) References Cited

U.S. PATENT DOCUMENTS

2015/0067476 A1* 3/2015 Song .................. G06F 16/9577
715/234
2017/0013072 A1* 1/2017 Liang ..................... H04L 67/22

FOREIGN PATENT DOCUMENTS

| CN | 106557565 A | 4/2017 |
| CN | 106802899 A | 6/2017 |

OTHER PUBLICATIONS

Liang et al., "Webpage Main Text Localization Based on Image and Text Effective Information Content"; School of Computer, Electronics and Information, Guangxi University, Nanning 530004, China, vol. 37, No. 23, Dec. 2011, pp. 276-278.

* cited by examiner

METHOD AND APPARATUS FOR RETRIEVING IMAGE-TEXT BLOCK FROM WEB PAGE

CROSS-REFERENCE TO RELATED APPLICATIONS

This application claims priority to Chinese Patent Application No. 201710941523.X, filed on Oct. 11, 2017, titled "Method and Apparatus for Retrieving Image-text Block from Web Page," which is hereby incorporated by reference in its entirety.

TECHNICAL FIELD

The disclosure relates to the field of computer technology, specifically to the field of Internet technology, and more specifically to a method and apparatus for retrieving an image-text block from a web page.

BACKGROUND

As the Internet technology develops, there are increasingly abundant structural types of information data on the Internet, and how to efficiently acquire key information from a large number of web pages of different structural data types has become an important direction in research.

Usually, an image-text block having images and texts on a web page contains the key information of the web page, for example product information, processing technology, and other key information on the website of a machining equipment manufacturer, and is usually displayed using images and texts. When retrieving an image-text block from a web page, the existing method is generally manually analyzing the HyperText Markup Language (HTML) structure of a page, and obtaining the path of the image-text block by manual annotation, or retrieving the path of page elements of the image-text block clicked by the annotator using an annotation plugin. This method needs to manually annotate each page separately, and has low annotation efficiency. The page structure will be dynamically updated, that is, the HTML structure of the page will change, and it is necessary to reannotate the path of the image-text block, resulting in the inability to implement an automatic update.

SUMMARY

In order to solve one or more of the technical problems mentioned in the background section, a method and apparatus for retrieving an image-text block from a web page are provided according to embodiments of the disclosure.

In a first aspect, a method for retrieving an image-text block from a web page is provided according to an embodiment of the disclosure. The method includes: retrieving an image node from a document object model of a to-be-processed web page; filtering the image node based on a preset filtering rule to obtain candidate image nodes; traversing, for each of the candidate image nodes, a node in sequence toward an ancestor node of the candidate image node in a preset maximum traversal depth until an ancestor node with a text is visited, using the ancestor node with the text as a candidate image-text block corresponding to the candidate image node, and generating path information of the candidate image-text blocks based on locations of the candidate image-text blocks in the document object model; clustering the candidate image-text blocks based on hash values of the path information of the candidate image-text blocks to obtain at least one image-text block cluster; and determining, for each image-text block cluster, a common ancestor node of the candidate image-text blocks within the image-text block cluster based on the path information of the candidate image-text blocks, and determining path information of the image-text block cluster based on the common ancestor node.

In some embodiments, before the clustering the candidate image-text blocks based on hash values of the path information of the candidate image-text blocks to obtain at least one image-text block cluster, the method further includes: structuring the candidate image-text blocks into a structure having following data information: the path information of the candidate image-text blocks, path information of the candidate image-text blocks formatted based on a preset format, an image resource path in candidate image nodes corresponding to the candidate image-text blocks, and the hash values of the path information of the candidate image-text blocks.

In some embodiments, the path information includes path information labeled with a path language of an extensible markup language, and the hash values of the path information of the candidate image-text blocks are hash values for the path information of the candidate image-text blocks excluding a predicate condition; and the determining, for each image-text block cluster, a common ancestor node of the candidate image-text blocks within the image-text block cluster based on the path information of the candidate image-text blocks, and determining path information of the image-text block cluster based on the common ancestor node includes: determining, for each image-text block cluster, a common ancestor node of the candidate image-text blocks based on the path information of the candidate image-text blocks to obtain a predicate condition of path information of the common ancestor node; and combining the path information of the candidate image-text blocks within the image-text block cluster based on the predicate condition of the path information of the common ancestor node, and using the combined path information as the path information of the image-text block cluster.

In some embodiments, the method further includes: comparing the path information of the image-text block clusters to filter out overlapped path information.

In some embodiments, before the retrieving an image node from a document object model of a to-be-processed web page, the method further includes: cleaning data of the document object model of the to-be-processed web page to remove invalid nodes in the document object model.

In a second aspect, an apparatus for retrieving an image-text block from a web page is provided according to an embodiment of the disclosure. The apparatus includes: a retrieving unit, configured for retrieving an image node from a document object model of a to-be-processed web page; a filtering unit, configured for filtering the image node based on a preset filtering rule to obtain candidate image nodes; a searching unit, for traversing, for each of the candidate image nodes, a node in sequence towards an ancestor node of the candidate image node in a preset maximum traversal depth until an ancestor node with a text is visited, using the ancestor node with the text as a candidate image-text block corresponding to the candidate image node, and generating path information of the candidate image-text blocks based on locations of the candidate image-text blocks in the document object model; a clustering unit, configured for clustering the candidate image-text blocks based on hash values of the path information of the candidate image-text blocks to obtain at least one image-text block cluster; and a determining unit, configured for determining, for each image-text block cluster, a common ancestor node of the candidate image-text blocks within the image-text block cluster based on the path information of the candidate image-text blocks, and determining path information of the image-text block cluster based on the common ancestor node.

In some embodiments, the apparatus further includes: a structuring unit, configured for structuring, before the clustering unit clusters the candidate image-text blocks based on hash values of the path information of the candidate image-text blocks to obtain at least one image-text block cluster, the candidate image-text blocks into a structure having following data information: the path information of the candidate image-text blocks, path information of the candidate image-text blocks formatted based on a preset format, an image resource path in candidate image nodes corresponding to the candidate image-text blocks, and the hash values of the path information of the candidate image-text blocks.

In some embodiments, the path information includes path information labeled with a path language of an extensible markup language, and the hash values of the path information of the candidate image-text blocks are hash values for the path information of the candidate image-text blocks excluding a predicate condition; and the determining unit is further configured for determining path information of the image-text block cluster by: determining, for each image-text block cluster, a common ancestor node of the candidate image-text blocks based on the path information of the candidate image-text blocks to obtain a predicate condition of path information of the common ancestor node; and combining the path information of the candidate image-text blocks within the image-text block cluster based on the predicate condition of the path information of the common ancestor node, and using the combined path information as the path information of the each image-text block cluster.

In some embodiments, the apparatus further includes: a comparing unit, configured for comparing the path information of the image-text block clusters to filter out overlapped path information.

In some embodiments, the apparatus further includes: a cleaning unit, configured for cleaning, before the retrieving unit retrieves an image node from a document object model of a to-be-processed web page, data of the document object model of the to-be-processed web page to remove invalid nodes in the document object model.

A method and apparatus for retrieving an image-text block from a web page provided by some embodiments of the disclosure firstly retrieve an image node from a document object model of a to-be-processed web page, then filter the image node based on a preset filtering rule to obtain candidate image nodes, then traverse, for each of the candidate image nodes, a document object model to obtain a corresponding text node, then combine the candidate image node and the corresponding text node, generate candidate image-text blocks, and generate path information of the candidate image-text blocks based on locations of the candidate image node and the corresponding text node in the document object model; then cluster the candidate image-text blocks based on hash values of the path information of the candidate image-text blocks to obtain a plurality of image-text block clusters, finally determine, for each of the image-text block clusters, a common ancestor node of the candidate image-text blocks within the image-text block cluster based on the path information of the candidate image-text blocks, and determine path information of the image-text block cluster based on the common ancestor node, thereby achieving automatically generating and acquiring path information of the image-text block on the web page, and improving the efficiency in retrieving the image-text block from the web page.

BRIEF DESCRIPTION OF THE DRAWINGS

By reading and referring to detailed descriptions on the non-limiting embodiments in the following accompanying drawings, other features, objects and advantages of the disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
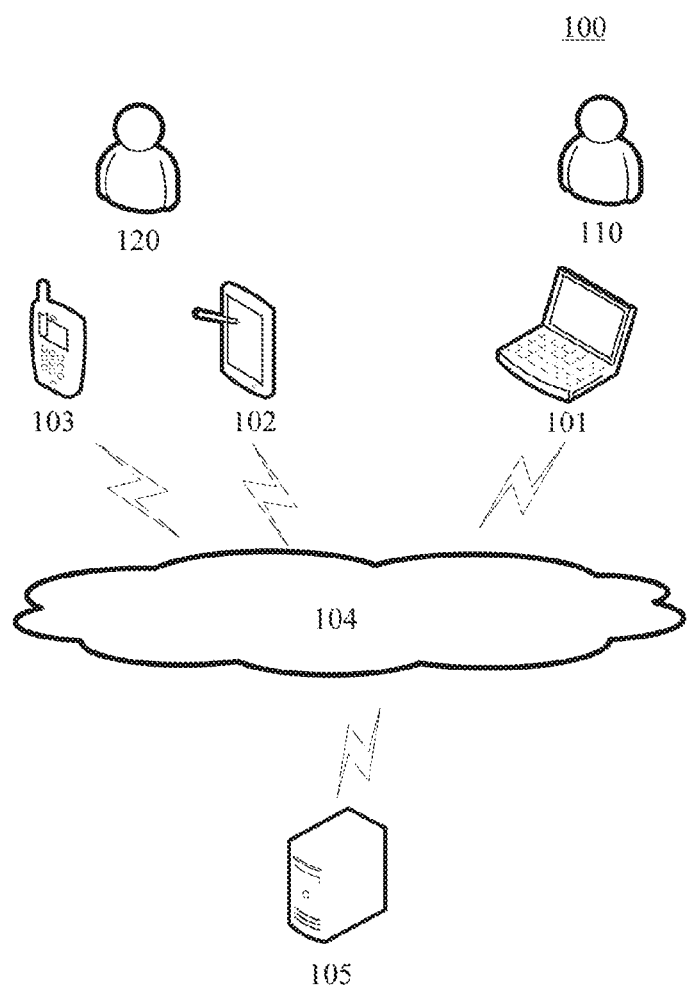
FIG. 1 is a diagram of an architecture in which the disclosure may be applied according to some embodiments.

Reference is made to FIG. 1, which shows an architecture in which some embodiments of the disclosure may be applied.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fiber.

A user 110 may interact with the server 105 using the terminal device 101 through the network 104, to receive or send messages, etc. A user 120 may interact with the server 105 using the terminal devices 102 and 103 through the network, to receive or send messages, etc. Here, the user 110 may be a user providing backstage web page data, e.g., a maintainer of a website, the user 120 may be a user requesting access to the backstage web page data provided by the user 110. The terminal devices 102 and 103 may be installed with a variety of information acquisition applications, such as a web browser application, a search application and social platform software.

The terminal devices 101, 102 and 103 may be various electronic devices having a display screen and supporting accessing the Internet, including but not limited to, smart phones, tablet computers, e-book readers, MP3 (Moving Picture Experts Group Audio Layer III) players, MP4 (Moving Picture Experts Group Audio Layer IV) players, laptop computers and desktop computers.

The server 105 may be a server providing various services, for example, a backend server responding to a page changing request submitted by a terminal device 105, responding to a page accessing request from the terminal devices 102 or 103. The backend server may perform analysis, address searching, content changing on the page changing request, perform analysis, related data searching, data analysis on the page accessing request, and return a processing result to the terminal devices 101, 102 and 103.

It should be noted that the method for retrieving an image-text block according to the embodiments of the present disclosure is generally executed by the server 105. Accordingly, the apparatus for retrieving an image-text block is generally installed on the server 105.

It should be appreciated that the numbers of the terminal devices, the networks and the servers in FIG. 1 are merely illustrative. Any number of terminal devices, networks and servers may be provided based on the actual requirement.

Figure 2:
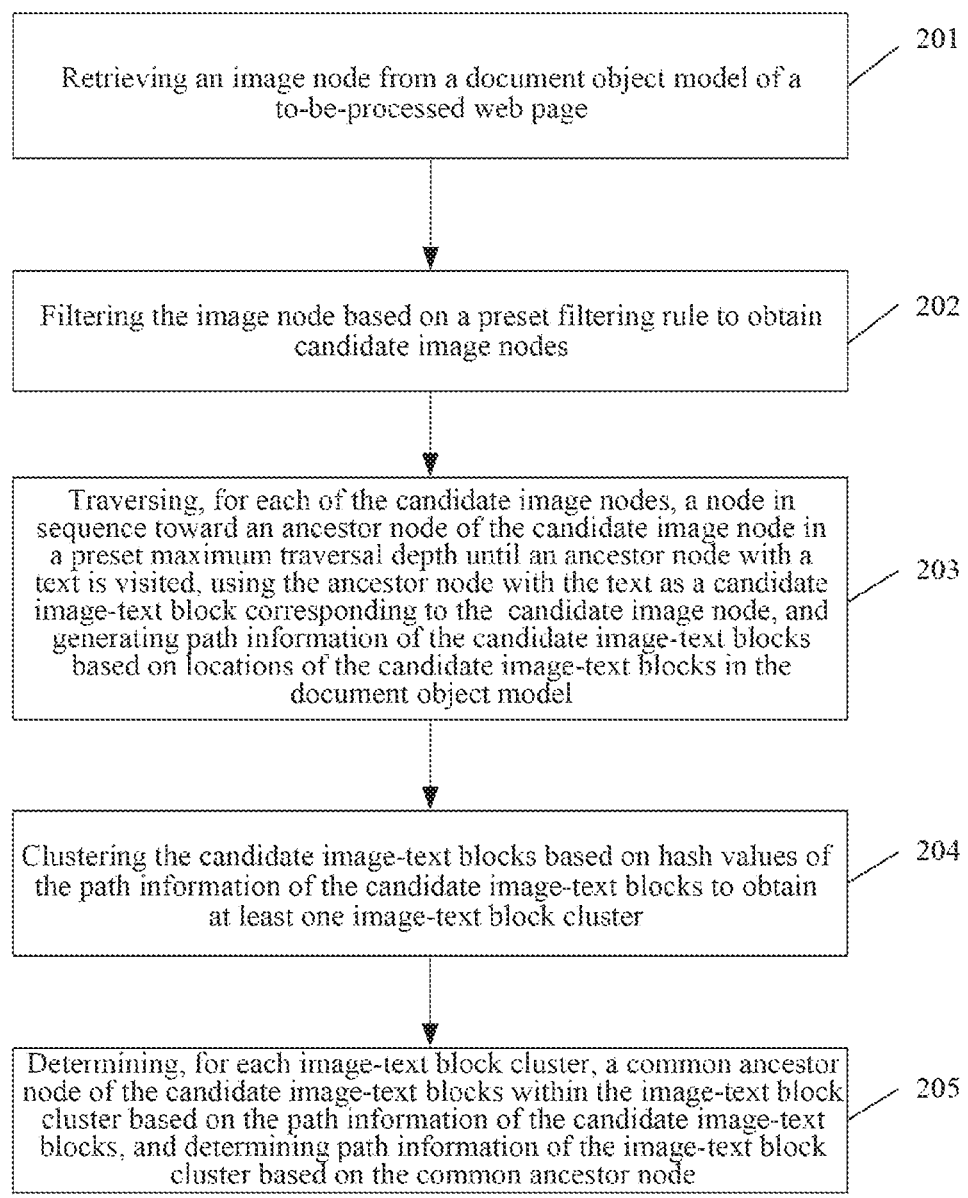
FIG. 2 is a schematic flowchart of a method for retrieving an image-text block from a web page according to an embodiment of the disclosure.

Reference is made to FIG. 2, which shows a flow 200 of a method for retrieving an image-text block from a web page according to an embodiment of the disclosure. The method for retrieving an image-text block from a web page includes steps 201 to 205.

Step 201 includes: retrieving an image node from a document object model of a to-be-processed web page.

In the embodiment, an electronic device (e.g., the server 105 as shown in FIG. 1) in which the method for retrieving an image-text block from a web page is performed may firstly acquire an HTML structure of the to-be-processed web page, i.e., acquiring an HTML source code of the to-be-processed web page.

Generally, a web page corresponds to an HTML document, the HTML document organize a page element display mode in a specific format, and a lot of tags are defined therein. The tags are labels defining how a browser displays a corresponding content. The HTML document includes a head and a body, where "<body>" is used as a head label of the body, and "</body>" is used as an end label of the body.

The body may include a title, a body text, an image, a table, a typesetting format, and the like. The title may be labeled with a tag "<title>", the body text may be labeled with text tags, e.g., a pre-formatted text tag "<pre>" and a font size tag "<font size=?>", the image may be labeled with a tag "<img>", the table may be labeled with a tag "<table>", and the typesetting format may be labeled with a tag, such as a paragraph tag, a line feed tag, and an indent tag.

In the embodiment, the HTML document of the to-be-processed web page may be converted into a document object model (DOM). The DOM is an interface for acquiring, adding and deleting HTML, and is generally a set of nodes organized in a tree structure. In the DOM tree, the content of the HTML document is converted into nodes, and each of the nodes may represent an element, a text, or an attribute in the HTML document. The whole HTML document is a document node, each HTML element is an element node, a text within the HTML element is a text node, each HTML attribute is an attribute node, and an annotation is an annotation node.

In the embodiment, the image node may be retrieved from the DOM tree of the to-be-processed page, i.e., a node corresponding to an image tag "<img>" is retrieved. The image node here corresponds to an image element on the web page and an attribute of the image element, and may include a source attribute (src attribute) and an alternate text attribute (alt attribute) of the image. Optionally, the image node may further include a height (height attribute), a width (width attribute), an alignment (align attribute), a border (border attribute) of the image, and the like.

Step 202 includes: filtering the image node based on a preset filtering rule to obtain a candidate image node.

After the retrieve, the retrieved image node may be filtered based on the preset filtering rule. Here, the preset filtering rule may be a rule related to a size, a style, a source, an alternate text, a surrounding text in the DOM tree, or a parent node, of an image. That is, the filtering rule may be set based on this information of the image. For example, an image of small size usually includes limited amounts of information, and may be filtered out, and then the filtering rule may include filtering out an image having a size smaller than a preset size.

The filtering rule may be a rule established based on the product and business needs. For example, in some business scenarios, insufficient alternate text bytes of the image may indicate that the image does not include substantial content, and the filtering rule may be set to filter out an image having an alt attribute in which text bytes are insufficient. The candidate image node may be obtained by filtering the image node based on the preset filtering rule.

Step 203 includes: traversing, for each candidate image node, a node in sequence toward an ancestor node in a preset maximum traversal depth until an ancestor node with a text is visited, using the ancestor node with the text as a candidate image-text block corresponding to the candidate image node, and generating path information of the candidate image-text block based on a location of the candidate image-text block in the document object model.

In the embodiment, ancestor nodes of the candidate image node in the DOM tree may be traversed in sequence to find out a text associated with an image corresponding to the candidate image node. Specifically, the maximum traversal depth, e.g., 3 layers, may be preset, and for each candidate image node, a node in 3 upper layers may be traversed in sequence from a father node toward an ancestor node until an ancestor node including a text is visited, and the ancestor node is determined as the candidate image-text block corresponding to the candidate image node. Furthermore, during the traversal, for each visited ancestor node, whether an element of the ancestor node includes a text content may be determined. If the element of the ancestor node includes the text content, then the ancestor node is the image-text block node corresponding to the candidate image node; otherwise, an ancestor node of an upper layer may be further traversed. Optionally, if the node with the text is not found in the preset maximum traversal depth, then it is determined that the candidate image node may not correspond to an image-text block.

Here, the candidate image-text block is a node in the DOM tree of the to-be-processed web page. The node includes a sub-node being the candidate image node. That is, the candidate image-text block includes a text content and an image sub-node.

After determining the candidate image-text block corresponding to each candidate image node, path information of the candidate image-text block may be determined based on the location of the candidate image-text block in the DOM tree. In the DOM tree, path information of a node may be a path for accessing to the node, and may be expressed by an expression of a specific path language, e.g., expressed by an extensible markup language (XML) path language (Xpath).

In the embodiment, the electronic device may generate an XPath path expression of the candidate image-text block based on the node location of the candidate image-text block, as path information of the candidate image-text block.

Step 204 includes: clustering the candidate image-text blocks based on hash values of the path information of the candidate image-text blocks to obtain at least one image-text block cluster.

In the embodiment, message digest algorithm MD5 (MD5) values of the path information of the candidate image-text blocks may be obtained by executing a hash operation on the path information of the candidate image-text blocks, and then the candidate image-text blocks are divided into one or more image-text block clusters based on the MD5 values of the candidate image-text blocks. The candidate image-text blocks for a given image-text block cluster have the same MD5 value.

Step 205 includes: determining, for each image-text block cluster, a common ancestor node of the candidate image-text blocks within the image-text block cluster based on the path information of the candidate image-text blocks, and determining path information of the image-text block cluster based on the common ancestor node.

After the candidate image-text blocks are clustered into one or more image-text block clusters, the common ancestor node of each image-text block cluster may be found based on path information of the candidate image-text blocks in each image-text block cluster, and path information of the common ancestor node may be used as the path information of the image-text block cluster. Thus, path information denoting a location of the ancestor node may be configured for identifying locations of all candidate image-text blocks in the image-text block cluster.

Specifically, expressions of path information of any two candidate image-text blocks in each of the image-text block clusters have the same hash value, and the expressions of the path information of the two candidate image-text blocks inevitably include a given character string. Path information of the common ancestor node may be determined based on the given character string in the expressions of the path information of the image-text blocks.

For example, if expressions of Xpath information of path information of two image-text blocks in an image-text block cluster are: "xpath:/html/body/div[1]/div[3]/div[1]/div[2]" and "xpath:/html/body/div[1]/div[3]/div[1]/div[1]" respectively, and the two expressions include a given character string "xpath:/html/body/div[1]/div[3]/div[1]", then the character string may be determined as an expression of path information of a common ancestor node of the two image-text blocks, thereby determining the common ancestor node of the two image-text blocks. Further, by retrieving a common character string of expressions of path information of all image-text blocks in a given image-text block cluster, the path information of the common ancestor node of the image-text blocks in the given image-text block cluster may be determined.

After determining the path information of the common ancestor node of the image-text blocks within each image-text block cluster, the path information of the common ancestor node of the image-text blocks within each image-text block cluster may be determined as the path information corresponding to the image-text block cluster. Thus, path information of at least one image-text block cluster may be obtained, and all contents (including sub-nodes and attributes thereof) of corresponding nodes may be retrieved from a to-be-processed web page of a browser using the path information, thereby achieving retrieving the image-text block from the web page.

In the method for retrieving an image-text block from a web page according to the above embodiments of the disclosure, an image node is retrieved from a document object model of a to-be-processed web page, then the image node is filtered based on a preset filtering rule to obtain candidate image nodes, for each of the candidate image nodes, a document object model is traversed to obtain a corresponding text node, the candidate image node and the corresponding text node are combined to generate a candidate image-text block, and path information of the candidate image-text block is generated based on locations of the candidate image node and the corresponding text node in the document object model; the candidate image-text blocks are clustered based on hash values of the path information of the candidate image-text blocks to obtain a plurality of image-text block clusters, for each image-text block cluster, a common ancestor node of the candidate image-text blocks within the image-text block cluster is determined based on the path information of the candidate image-text blocks, and path information of the image-text block cluster is determined based on the common ancestor node, thereby achieving automatically acquiring path information of the image-text block on the web page, and improving the efficiency in retrieving the image-text block from the web page compared with the method for retrieving an image-text block by manual annotation.

The application scenario of the above embodiments of the disclosure may be: a search engine may backstage process a web page in a web page database, retrieve image nodes in a DOM tree of the web page, then filter the image nodes to obtain candidate image nodes, then find a text content associated with each of the candidate image nodes from the DOM tree to determine a candidate text block, and finally characterize an access path of all image-text blocks within a candidate text block cluster using path information of a common ancestor node of text blocks within the cluster, thereby retrieving the image-text block from the web page based on generated path information. Then the search engine may display the retrieved image-text block on a search result page when providing a search result.

Figure 3:
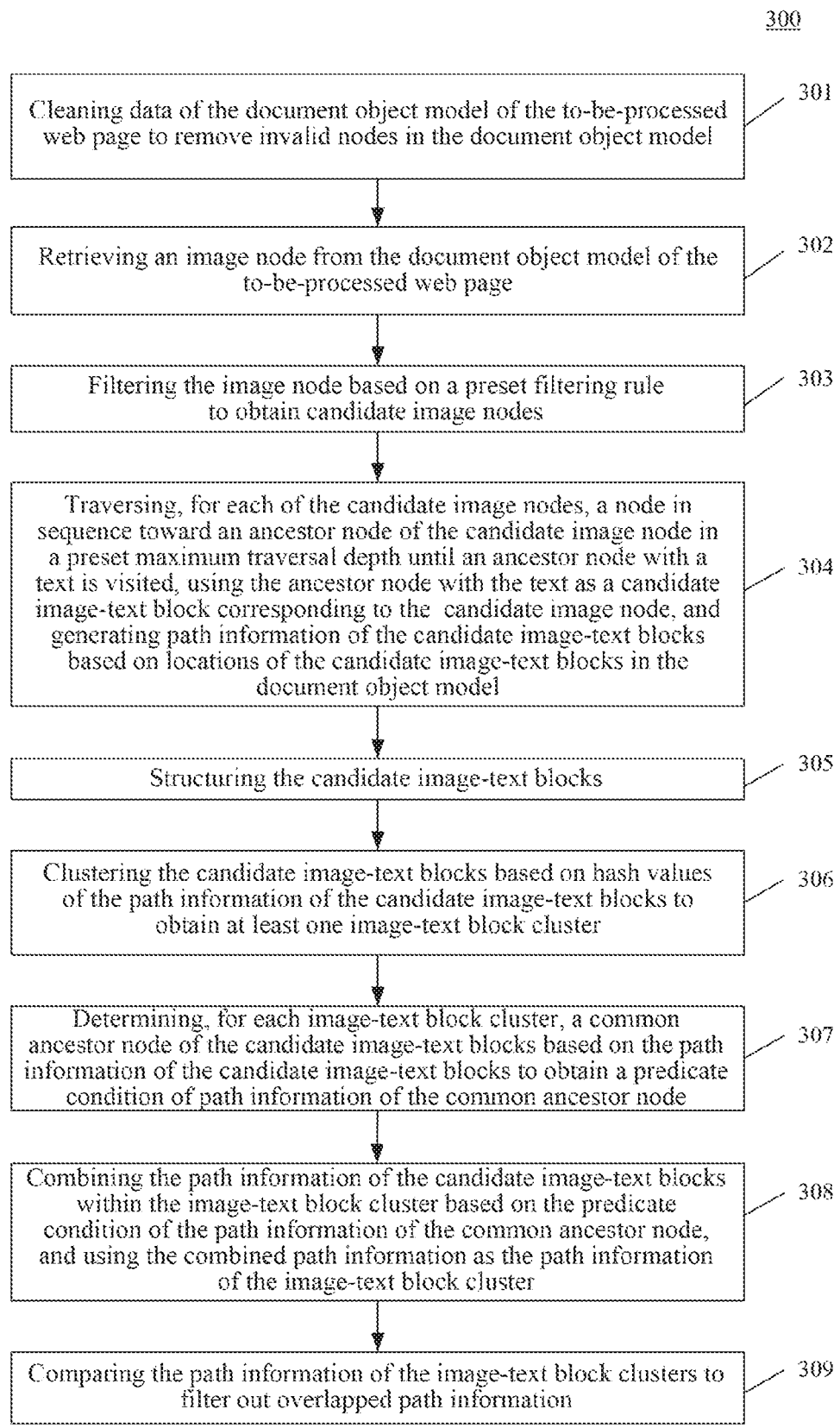
FIG. 3 is a schematic flowchart of a method for retrieving an image-text block from a web page according to another embodiment of the disclosure.

Reference is made to FIG. 3, which shows a schematic diagram of a flow of a method for retrieving an image-text block from a web page according to another embodiment of the disclosure. As shown in FIG. 3, a flow 300 of the method for retrieving an image-text block from a web page includes steps 301 to 309.

Step 301 includes: cleaning data of a document object model of a to-be-processed web page to remove invalid nodes in the document object model.

In the embodiment, firstly, data of the DOM tree of the to-be-processed web page may be cleaned to remove invalid nodes. The invalid nodes may include a node excluding substantial contents such as a page element, e.g., a pure style node, and may also include a node irrelevant to a page topic, e.g., an advertisement link and an invalid character.

Specifically, a style tag such as a horizontal line tag <hr> may be deleted, or an advertisement link may be identified from a tag-defined text and be removed, or some tags defining an invalid character may be eliminated.

By cleaning data of the to-be-processed web page, an HTML structure of the to-be-processed web page may be simplified to facilitate improving a searching efficiency in searching for a node in subsequent processing.

Step 302 includes: retrieving an image node from the document object model of the to-be-processed web page.

In the embodiment, the image node in an HTML document of the to-be-processed web page is usually labeled with an image tag "<img>", and all image nodes may be retrieved by locating the image tag "<img>". Here, the image node may include a source attribute (src attribute) and an alternate text attribute (alt attribute) of an image.

Step 303 includes: filtering the image node based on a preset filtering rule to obtain candidate image nodes.

After retrieving all image nodes from the DOM tree, the image nodes may be filtered based on the preset filtering rule. The filtering rule here may be a rule pre-established based on business needs. For example, an image node having a small image size may be filtered out, an image node having a character number of an alternate text of an image smaller than a preset character number may be filtered out, and so on.

Step 304 includes: traversing, for each of the candidate image nodes, a node in sequence towards an ancestor node of the candidate image node in a preset maximum traversal depth until an ancestor node with a text is visited, using the ancestor node with the text as a candidate image-text block corresponding to the candidate image node, and generating path information of the candidate image-text blocks based on locations of the candidate image-text blocks in the document object model.

In the embodiment, ancestor nodes of the candidate image node in the DOM tree may be traversed in sequence to find out a text associated with an image corresponding to the candidate image node. Specifically, the maximum traversal depth, e.g., 3 layers, may be preset, and for each candidate image node, a node in 3 upper layers may be traversed in sequence toward an ancestor node, that is a father node of the candidate image node is visited first, if the father node of the candidate image node does not satisfy a condition, the traversal is performed upwardly until an ancestor node with a text is visited, and the ancestor node with the text is determined as a candidate image-text block corresponding to the candidate image node.

Optionally, the maximum traversal depth may be an empirical value. Specifically, the maximum traversal depth may be set by statistics, using a large number of web pages, of a depth between an image node corresponding to an image and a text node associated with the image.

Step 305 includes: structuring the candidate image-text blocks.

In the embodiment, the candidate image-text block may be structured into a structure having following data information: the path information of the candidate image-text block, path information of the candidate image-text block formatted according to a preset format, an image resource path in candidate image nodes corresponding to the candidate image-text block, and the hash value of the path information of the candidate image-text block.

Specifically, the path information of the candidate image-text block may be expressed by a specific language path expression, and may be formatted according to the preset format. The image resource paths may be retrieved from the image nodes corresponding to the candidate image-text block, specifically by retaining the src attribute of the image tag, and removing other attributes (such as an alt attribute, a height attribute and a width attribute). The hash value may be obtained by executing a hash operation on a path expression of the candidate image-text block.

Furthermore, the path information of the candidate image-text block may be expressed by an Xpath expression, and the structured candidate image-text block include fields as shown in Table 1.

TABLE 1

Field of Candidate Image-Text Block and Description thereof

| Field title | Field description |
| --- | --- |
| format_xpath | a formatted Xpath expression |
| dom | a DOM node corresponding to an image-text block |
| md5 | a hash value of an xpath |
| xpath | an Xpath expression of a candidate image-text block |
| src | a resource path of an image in a candidate image-text block |

An expression of a formatted Xpath may be another expression of an xpath structured in a specific format after splitting nodes of the xpath. For example, the Xpath expression may be formatted to: {'group': group, 'xpath': [{'digit': digit,'tag':tag}, . . . ]}, where the "group" denotes a predicate condition of a node in an Xpath expression of a candidate image-text block. For example, an xpath of a candidate image-text block is: /html/body/div[1], then "1" in the square bracket "[ ]" is a predicate condition of a node div, denoting the 1st div sub-element of the body, and a value of "group" of the candidate image-text block is 1. The "digit" denotes a digital unit, the digit value may be 1, 2, 10, and so on, and the "tag" may be a tag title such as div.

By structuring candidate image-text blocks, data irrelevant to the path information of nodes in the candidate image-text blocks may be removed to facilitate clustering the candidate image-text blocks based on hash values of the path information in subsequent process, thereby finding path information of an ancestor node from which all image-text blocks may be retrieved.

Step 306 includes: clustering the candidate image-text blocks based on hash values of the path information of the candidate image-text blocks to obtain at least one image-text block cluster.

In the embodiment, the path information includes path information labelled with an Xpath, and the hash values of the path information of the candidate image-text blocks are hash values for the path information of the candidate image-text blocks excluding a predicate condition (condition defined in the square brackets "[ ]"). For example, the path information of the candidate image-text blocks may be a following xpath: /html/body/div[1]/div[3]/div[1]/div[2]/div[2], then the hash values of the path information of the candidate image-text blocks may be hash values acquired by executing a hash operation on a character string "/html/body/div/div/div/div/div".

Candidate image-text blocks having a given hash value may be clustered into one cluster using a data structure of structured candidate image-text blocks to obtain one or more image-text block clusters.

Step 307 includes: determining, for each image-text block cluster, a common ancestor node of the candidate image-text blocks based on the path information of the candidate image-text blocks to obtain a predicate condition of path information of the common ancestor node.

In the embodiment, the common ancestor node of the candidate image-text blocks within a given image-text block cluster may be found based on an xpath in a data structure of the candidate image-text blocks to obtain a predicate condition of path information of the common ancestor node, i.e., obtaining a value of "group" of the common ancestor node.

Specifically, nodes labelled in the xpath expression of a plurality of image-text blocks within a given image-text block cluster may be compared one by one from a node in an uppermost layer, nodes in a next lower layer are further compared if all of the currently compared nodes of the image-text blocks within the given image-text block cluster are consistent, and a last consistent node is determined as the common ancestor node of two image-text blocks if the currently compared nodes of the image-text blocks within the given image-text block cluster are not consistent.

For example, if an image-text block cluster includes two image-text blocks, the two image-text blocks have an xpath of "/html/body/div[1]/div[3]/div[1]/div[2]/div[2]" and "/html/body/div[1]/div[3]/div[1]/div[3]" respectively, path information of a common ancestor node of the two image-text blocks is "/html/body/div[1]/div[3]/div[1]", and a predicate condition of the path information of the common ancestor node is "1".

In some optional implementations of the embodiment, a difference node of path information of different image-text blocks within an image-text block cluster may be calculated using path information format_group of candidate image-text blocks formatted in the preset format to obtain the value of "group". Specifically, nodes in the format_xpath are split into separate elements, difference nodes in the format_xpath of different image-text blocks may be obtained by comparison, and then a value of "group" of a father node of the difference node in an uppermost layer of the DOM tree is used as the predicate condition of the path information of the common ancestor node.

Step 308 includes: combining the path information of the candidate image-text blocks within the image-text block cluster based on the predicate condition of the path information of the common ancestor node, and using the combined path information as the path information of the image-text block cluster.

The path information of the candidate image-text blocks within the image-text block cluster may be combined based on the predicate condition of the Xpath expression of the common ancestor node, i.e., the path information of sub-nodes having a given ancestor node is combined. The specific combining method may be: using the Xpath expression of the path information of the common ancestor node as the path information of the image-text block cluster.

By combining the path information of the candidate image-text blocks within the image-text block cluster, multiple pieces of the path information may be obtained, and all image-text blocks may be retrieved from the to-be-processed web page based on the pieces of path information.

Step 309 includes: comparing the path information of the image-text block clusters to filter out overlapped path information.

In the embodiment, after obtaining the path information of the image-text block clusters, the path information of different image-text block clusters can be compared, and if there is an inclusion relation between expressions of the path information of different image-text block clusters, then a shorter expression may be filtered out.

Generally, the shorter the path information expression is, the closer a node located by the path information expression to the top of the DOM tree is. By filtering out the shorter expression in overlapped expressions of path information, path information locating ancestor nodes may be filtered out, thereby avoiding retrieving contents expect image-text blocks from the to-be-processed web page.

The steps 302, 303 and 304 in above method are identical to the steps 201, 202 and 203 in the preceding embodiments. The above descriptions on the steps 201, 202 and 203 also applies to the steps 302, 303 and 304 in the embodiment, which are not repeated any more here.

As can be seen from FIG. 3, compared with the embodiment shown in FIG. 2, the steps of cleaning data of the document object model of the to-be-processed web page to remove invalid nodes in the document object model, structuring the candidate image-text blocks, and comparing the path information of the image-text block clusters to filter out overlapped path information are added, and the step of determining path information of the image-text block clusters is detailed in the method for retrieving an image-text block from a web page according to the embodiment. Therefore, the method for retrieving an image-text block from a web page according to the embodiment can further improve the efficiency in acquiring path information locating an image-text block, and improve the accuracy in locating an image-text block.

Figure 4:
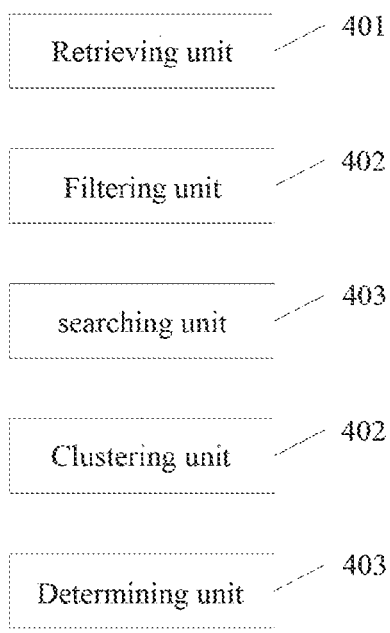
FIG. 4 is a structural schematic diagram of an apparatus for retrieving an image-text block from a web page according to an embodiment the disclosure.

Further referring to FIG. 4, as an implementation of the method, an apparatus for retrieving an image-text block from a web page is provided according to an embodiment of the disclosure.

As shown in FIG. 4, an apparatus 400 for retrieving an image-text block from a web page according to the embodiment of the disclosure may include: a retrieving unit 401, a filtering unit 402, a searching unit 403, a clustering unit 404 and a determining unit 405. The retrieving unit 401 is configured for retrieving an image node from a document object model of a to-be-processed web page; the filtering unit 402 is configured for filtering the image node based on a preset filtering rule to obtain candidate image nodes; the searching unit 403 is configured for traversing, for each of the candidate image nodes, a node in sequence toward an ancestor node of the candidate image node in a preset maximum traversal depth until an ancestor node with a text is visited, using the ancestor node with the text as a candidate image-text block corresponding to the candidate image node, and generating path information of the candidate image-text blocks based on locations of the candidate image-text blocks in the document object model; the clustering unit 404 is configured for clustering the candidate image-text blocks based on hash values of the path information of the candidate image-text blocks to obtain at least one image-text block cluster; and the determining unit 405 is configured for determining, for each image-text block cluster, a common ancestor node of the candidate image-text blocks within the image-text block cluster based on the path information of the candidate image-text blocks, and determining path information of each image-text block cluster based on the common ancestor node.

In the embodiment, the retrieving unit 401 may be configured for retrieving a node corresponding to an image tag "<img>" from the document object model of the to-be-processed web page. The retrieved node is an image node. The image node here corresponds to an image element on a web page and an attribute of the image element, and may include a source attribute (src attribute) and an alternate text attribute (alt attribute) of an image. Optionally, the image node may further include a height (height attribute), a width (width attribute), an alignment (align attribute), a border (border attribute) of the image, and the like.

The filtering unit 402 may filter image nodes retrieved by the retrieving unit 401 according to a preset filtering rule associated with a size, a style, a source, an alternate text, a surrounding text, a father node or the like, of the image. For example, an image node corresponding to an image smaller than a preset size may be filtered out, or an image node corresponding to an image larger than the preset size may be retained, an image node having an alt attribute in which byte number smaller than a preset byte number may be filtered out, and so on.

The searching unit 403 may search for a node with a text corresponding to an image node in the DOM tree to find out a text content corresponding to an image, thereby forming an image-text block. A specific searching method may include traversing a node in sequence toward an ancestor node of an image node from a father node of the image node until an ancestor node with a text is visited, using the ancestor node with the text as a candidate image-text block, and using path information of the ancestor node with the text as path information labelling a path of a retrieved candidate image-text block.

The clustering unit 404 may cluster the candidate image-text blocks based on hash values of the path information of the candidate image-text blocks, and specifically may cluster candidate image-text blocks having a given hash value of the path information into a given image-text block cluster.

The determining unit 405 may find out, for each image-text block cluster, a common ancestor node of the image-text blocks farthest from the top of the DOM tree, and determine the path information of the common ancestor node as the path information of the image-text block cluster. A browser may automatically retrieve one or more image-text blocks from a corresponding image-text block cluster based on the path information.

In some embodiments, the apparatus 400 may further include: a structuring unit, configured for structuring, before the clustering unit clusters the candidate image-text blocks based on hash values of the path information of the candidate image-text blocks to obtain at least one image-text block cluster, the candidate image-text blocks into a structure having following data information: the path information of the candidate image-text block, path information of the candidate image-text block formatted according to a preset format, an image resource path in candidate image node corresponding to the candidate image-text block, and the hash value of the path information of the candidate image-text block.

In a further embodiment, the path information may include path information labeled with an extensible markup language (XML), and hash values of the path information of the candidate image-text blocks are hash values for the path information of the candidate image-text blocks excluding a predicate condition.

In some embodiments, the determining unit 405 may be further configured for determining path information of the image-text block cluster by: determining, for each image-text block cluster, a common ancestor node of the candidate image-text blocks based on the path information of the candidate image-text blocks to obtain a predicate condition of path information of the common ancestor node; and combining the path information of the candidate image-text blocks within the image-text block cluster based on the predicate condition of the path information of the common ancestor node, and using the combined path information as the path information of the image-text block cluster.

In some embodiments, the apparatus 400 may further include: a comparing unit, configured for comparing the path information of the image-text block clusters to filter out overlapped path information.

In some embodiments, the apparatus 400 may further include: a cleaning unit, configured for cleaning, before the retrieving unit retrieves the image node from the document object model of the to-be-processed web page, data of the document object model of the to-be-processed web page to remove invalid nodes in the document object model.

It should be appreciated that the units disclosed in the apparatus 400 correspond to the steps in the method described in FIG. 2 and FIG. 3. Therefore, the operations and features described hereinbefore for the method are also applicable to the apparatus 400 and the units included therein, and are not repeated any more here.

The apparatus 400 for retrieving an image-text block from a web page according to the embodiment of the disclosure can automatically generate path information of an image-text block from a web page based on an HTML structure of the web page, achieving automatically retrieving an image-text block from a web page without the need of human-aided annotation and retrieval, and improving the efficiency in retrieving the image-text block from the web page.

Figure 5:
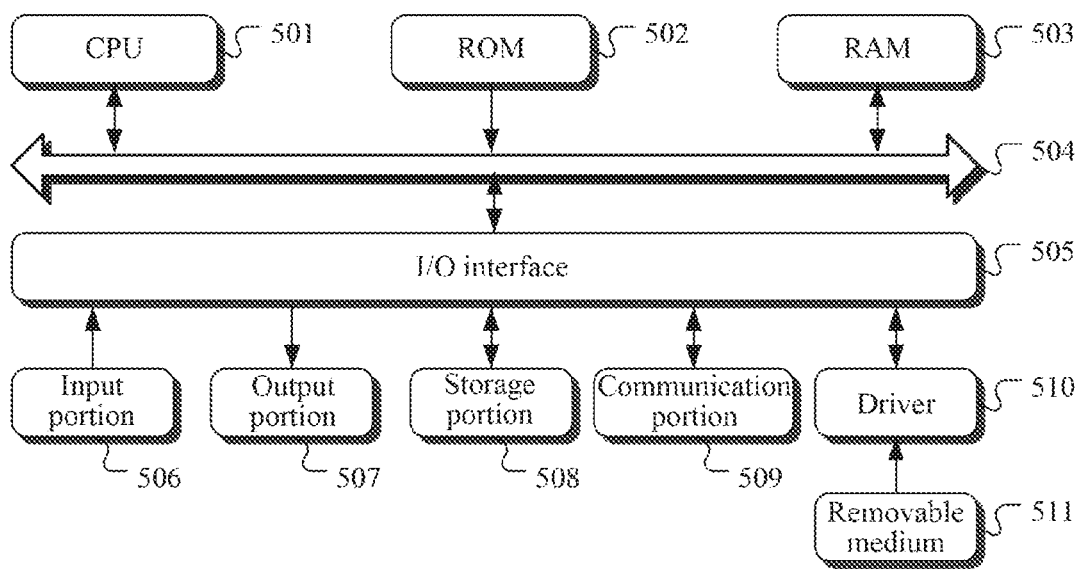
FIG. 5 is a structural schematic diagram of a computer system adapted to implement a server according to an embodiment of the disclosure.

Referring to FIG. 5, a schematic structural diagram of a computer system 500 adapted to implement a server of the embodiments of the present disclosure is shown. The server shown in FIG. 5 is only an example, and is not a limitation to the function and the scope of the embodiments of the disclosure.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 including a cathode ray tube (CRT), a liquid crystal display device (LCD), a speaker etc.; a storage portion 508 including a hard disk and the like; and a communication portion 509 including a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program includes program codes for executing the method as illustrated in the flow chart. In such an embodiment, the computer program may be downloaded and installed from a network via the communication portion 509, and/or may be installed from the removable media 511. The computer program, when executed by the central processing unit (CPU) 501, implements the above mentioned functionalities as defined by the methods of according to some embodiments the present disclosure. It should be noted that the computer readable medium in according to some embodiments the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the computer readable storage medium may be any physical medium containing or storing programs which can be used by a command execution system, apparatus or element or incorporated thereto. In some embodiments of the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instruction.

The units involved in the embodiments of the present disclosure may be implemented by means of software or hardware. The described units may also be provided in a processor, for example, described as: a processor, including a retrieving unit, a filtering unit, a searching unit, a clustering unit and a determining unit, where the names of these units do not in some cases constitute a limitation to such units themselves. For example, the retrieving unit may also be described as "a unit for retrieving an image node from a document object model of a to-be-processed webpage."

In another aspect, some embodiments of the present disclosure further provide a computer-readable medium. The computer-readable medium may be the computer medium included in the apparatus in the above described embodiments, or a stand-alone computer-readable medium not assembled into the apparatus. The computer-readable medium stores one or more programs. The one or more programs, when executed by a device, cause the device to: retrieve an image node from a document object model of a to-be-processed web page; filter the image node based on a preset filtering rule to obtain candidate image nodes; traverse, for each of the candidate image nodes, a node in sequence toward an ancestor node of the each candidate image node in a preset maximum traversal depth until an ancestor node with a text is visited, use the ancestor node with the text as a candidate image-text block corresponding to the each candidate image node, and generate path information of the candidate image-text blocks based on locations of the candidate image-text blocks in the document object model; cluster the candidate image-text blocks based on hash values of the path information of the candidate image-text blocks to obtain at least one image-text block cluster; and determine, for each image-text block cluster, a common ancestor node of the candidate image-text blocks within the image-text block cluster based on the path information of the candidate image-text blocks, and determining path information of the each image-text block cluster based on the common ancestor nod.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for retrieving an image-text block from a web page, the method comprising:
    retrieving an image node from a document object model of a to-be-processed web page, the image node including an attribute of an image;
    filtering the image node based on a preset filtering rule to obtain candidate image nodes;
    traversing, for each of the candidate image nodes, a node in sequence toward an ancestor node of the each candidate image node in a preset maximum traversal depth until an ancestor node with a text is visited, using the ancestor node with the text as a candidate image-text block corresponding to the each candidate image node, and generating path information of the candidate image-text blocks based on locations of the candidate image-text blocks in the document object model, wherein the candidate image-text block includes a text content and the candidate image node;
    clustering the candidate image-text blocks based on hash values of the path information of the candidate image-text blocks to obtain at least one image-text block cluster; and
    determining, for each image-text block cluster, a common ancestor node of the candidate image-text blocks within the each image-text block cluster based on the path information of the candidate image-text blocks, and determining path information of the each image-text block cluster based on the common ancestor node,
wherein the method is performed by at least one processor.

2. The method according to claim 1, wherein before the clustering the candidate image-text blocks based on hash values of the path information of the candidate image-text blocks to obtain at least one image-text block cluster, the method further comprises:
structuring the candidate image-text blocks into a structure including following data information: the path information of the candidate image-text blocks, path information of the candidate image-text blocks formatted based on a preset format, an image resource path in candidate image nodes corresponding to the candidate image-text blocks, and the hash values of the path information of the candidate image-text blocks.

3. The method according to claim 2, wherein the path information comprises path information labeled with a path language of an extensible markup language, and the hash values of the path information of the candidate image-text blocks are hash values for the path information of the candidate image-text blocks excluding a predicate condition; and
the determining, for each image-text block cluster, a common ancestor node of the candidate image-text blocks within the each image-text block cluster based on the path information of the candidate image-text blocks, and determining path information of the each image-text block cluster based on the common ancestor node comprises:
determining, for each image-text block cluster, a common ancestor node of the candidate image-text blocks based on the path information of the candidate image-text blocks to obtain a predicate condition of path information of the common ancestor node; and
combining the path information of the candidate image-text blocks within the each image-text block cluster based on the predicate condition of the path information of the common ancestor node, and using the combined path information as the path information of the each image-text block cluster.

4. The method according to claim 1, further comprising: comparing the path information of the image-text block clusters to filter out overlapped path information.

5. The method according to claim 1, wherein before the retrieving an image node from a document object model of a to-be-processed web page, the method further comprises:
cleaning data of the document object model of the to-be-processed web page to remove invalid nodes in the document object model.

6. An apparatus for retrieving an image-text block from a web page, the apparatus comprising:
at least one processor; and
a memory storing instructions, wherein the instructions when executed by the at least one processor, cause the at least one processor to perform operations, the operations comprising:
retrieving an image node from a document object model of a to-be-processed web page, the image node including an attribute of an image;
filtering the image node based on a preset filtering rule to obtain candidate image nodes;
traversing, for each of the candidate image nodes, a node in sequence towards an ancestor node of the each candidate image node in a preset maximum traversal depth until an ancestor node with a text is visited, using the ancestor node with the text as a candidate image-text block corresponding to the each candidate image node, and generating path information of the candidate image-text blocks based on locations of the candidate image-text blocks in the document object model, wherein the candidate image-text block includes a text content and the candidate image node;
clustering the candidate image-text blocks based on hash values of the path information of the candidate image-text blocks to obtain at least one image-text block cluster; and
determining, for each image-text block cluster, a common ancestor node of the candidate image-text blocks within the each image-text block cluster based on the path information of the candidate image-text blocks, and determining path information of the each image-text block cluster based on the common ancestor node.

7. The apparatus according to claim 6, wherein before the clustering the candidate image-text blocks based on hash values of the path information of the candidate image-text blocks to obtain at least one image-text block cluster, the operations further comprise:
structuring the candidate image-text blocks into a structure including following data information: the path information of the candidate image-text blocks, path information of the candidate image-text blocks formatted based on a preset format, an image resource path in candidate image nodes corresponding to the candidate image-text blocks, and the hash values of the path information of the candidate image-text blocks.

8. The apparatus according to claim 7, wherein the path information comprises path information labeled with a path language of an extensible markup language, and the hash values of the path information of the candidate image-text blocks are hash values for the path information of the candidate image-text blocks excluding a predicate condition; and
the determining, for each image-text block cluster, a common ancestor node of the candidate image-text blocks within the each image-text block cluster based on the path information of the candidate image-text blocks, and determining path information of the each image-text block cluster based on the common ancestor node comprises:
determining, for each image-text block cluster, a common ancestor node of the candidate image-text blocks based on the path information of the candidate image-text blocks to obtain a predicate condition of path information of the common ancestor node; and
combining the path information of the candidate image-text blocks within the each image-text block cluster based on the predicate condition of the path information of the common ancestor node, and using the combined path information as the path information of the each image-text block cluster.

9. The apparatus according to claim 6, wherein the operations further comprise:
comparing the path information of the image-text block clusters to filter out overlapped path information.

10. The apparatus according to claim 6, wherein before the retrieving an image node from a document object model of a to-be-processed web page, the operations further comprise: cleaning data of the document object model of the to-be-processed web page to remove invalid nodes in the document object model.

11. A non-transitory computer storage medium, storing a computer program, wherein the computer program, when executed by a processor, causes the processor to perform operations, the operations comprising:
    retrieving an image node from a document object model of a to-be-processed web page, the image node including an attribute of an image;
    filtering the image node based on a preset filtering rule to obtain candidate image nodes;
    traversing, for each of the candidate image nodes, a node in sequence toward an ancestor node of the each candidate image node in a preset maximum traversal depth until an ancestor node with a text is visited, using the ancestor node with the text as a candidate image-text block corresponding to the each candidate image node, and generating path information of the candidate image-text blocks based on locations of the candidate image-text blocks in the document object model, wherein the candidate image-text block includes a text content and the candidate image node;
    clustering the candidate image-text blocks based on hash values of the path information of the candidate image-text blocks to obtain at least one image-text block cluster; and
    determining, for each image-text block cluster, a common ancestor node of the candidate image-text blocks within the each image-text block cluster based on the path information of the candidate image-text blocks, and determining path information of the each image-text block cluster based on the common ancestor node.

12. The method according to claim 1, wherein the attribute of the image comprises a height and a width of the image.

* * * * *